United States Patent Office 2,813,129
Patented Nov. 12, 1957

2,813,129

PROCESS FOR PREPARING HIGH MOLECULAR WEIGHT POLYGLYCOLS

George J. Benoit, Jr., Anselmo, Calif., assignor to California Research Corporation, San Francisco, Calif., a corporation of Delaware No Drawing. Application June 29, 1954,
Serial No. 440,259

1 Claim. (Cl. 260—615)

The present invention relates to a novel class of high molecular weight polyglycols and to a novel method for their production. More particularly described, the present invention is concerned with new types of high molecular weight polyoxyalkylene glycols and ethers thereof having improved physical properties as synthetic lubricating oils, and with a new process whereby said polyoxyalkylene glycols and their ethers may be produced in greater yields while simultaneously avoiding excessive formation of contaminating by-products.

Polyoxyalkylene glycols of high molecular weight are useful as synthetic lubricating oils. In the majority of cases polyoxyalkylene glycols in the high molecular weight range are not produced as pure compounds, but are obtained as fractions of polymers from the polymerization of alkylene oxides. Such fractions include high molecular weight polyoxyalkylene glycols having a broad range of molecular weight distribution in most cases. This broad range of molecular weight distribution is highly undesirable in synthetic lubricating oils, since it invariably results in an objectionally high volatilty for a given weight lubricating oil fraction.

Polyoxyalkylene glycols and ethers thereof in the molecular weight range of about 2,000 and higher are difficult to prepare in many cases. Although polypropylene glycols, for example, are readily obtainable in molecular weights up to about 2,000 it is a problem to prepare higher molecular weight polypropylene glycols by conventional methods such as the polymerization of propylene oxides. These polyoxyalkylene glycols and their ethers having molecular weights above about 2,000 are particularly desirable as lubricating oil bright stocks of high quality which may be blended with oils of lower viscosity to produce superior lubricating oils of any given weight.

In the preparation of dialkyl ethers of polyglycols which are notably superior lubricants because of their excellent viscosity-temperature characteristics, a two-step process is ordinarily necessary. According to one method commonly employed, the etherifying alcohol is reacted with the desired number of alkylene oxide units in a first step to give the monopolyglycol ether. This monoether of the polyglycol is then converted to its alkali metal alcoholate in a second step and reacted with an alkyl or aryl halide to supply the second ether radical. Multi-step processes of this type are obviously at an economic disadvantage and cannot compete with processes involving fewer steps or with processes providing superior products by the same number of steps.

In accordance with the present invention, I have now discovered a novel class of bis(polyoxyalkyleneoxy) methanes and 2-alkenes having either hydrogen or alkyl terminal groups and from 1 to 18 carbon atoms in each of said alkyl groups, from 2 to 7 carbon atoms in each of said alkylene groups and from 3 to 7 carbon atoms in each of said 2-alkene groups.

I have also discovered a novel process for preparing these polyglycols and ethers thereof in accordance with the invention, which comprises reacting 2 mols of a polyoxyalkylene glycol alkali metal monoalcoholate or an alkyl monoether thereof with 1 mol of a member of the class consisting of methylene dihalides and 2-alkene dihalides of 3 to 7 carbon atoms and separating the bis-(polyoxyalkyleneoxy) methane, 2-alkene or diether thereof and the alkali metal halide thus formed.

In still another embodiment of the invention, one mol of polyoxyalkylene glycol alkali metal dialcoholate may be reacted with one mol of a methylene dihalide or 2-alkene dihalide of 3 to 7 carbon atoms to give a series of novel high molecular weight copolymeric (polyoxyalkylene) (oxymethylene) and (polyoxyalkylene (oxy-2-alkenylidene) compounds having recurring units of the type described above.

The novel, high molecular weight polyoxyalkylene glycols and ethers thereof prepared in accordance with the process of my invention possess improved physical properties compared to conventional high molecular weight polyoxyalkylene glycols and ethers which make them superior as lubricating oil compositions. They are readily obtainable either as pure compounds or as fractions of a narrow molecular weight range. This contributes much lower volatility compared to ordinary polyglycol lubricant fractions. Polypropylene glycols of high molecular weight in the lubricating oil bright stock range are also readily obtainable by the method of my invention as distinguished from conventional methods. The process of the invention has the still further advantage of providing superior diethers of high molecular weight polyalkylene glycols without the necessity of additional steps in the process, since the monoether of a polyglycol alkali metal monoalcoholate is reacted with the dihalomethane or 2-alkene to double the molecular weight and give the diether in but one simultaneous reaction.

The novel compounds of my invention may be further illustrated by the formula of the following type:

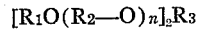

$$[R_1O(R_2-O)_n]_2R_3$$

in which $R_1$ is a member of the class consisting of hydrogen and alkyl radicals of 1 to 18 carbon atoms, $R_2$ is an alkylene group of 2 to 7 carbon atoms, $R_3$ is a member of the class consisting of methylene and a divalent 2-alkene group, such as the 2-alkenylidenes, of 3 to 7 carbon atoms, and $n$ is an integer of from 2 to 100.

Where copolymers of polyoxyalkylene glycol alkali metal dialcoholate and methylene dihalide or 2-alkene dihalide are concerned, as mentioned above, they may be illustrated as having recurring units of the following structure:

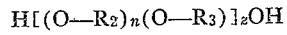

$$H[(O-R_2)_n(O-R_3)]_zOH$$

in which $R_2$, $R_3$ and $n$ are as described in the preceding formula, and $z$ is an integer equal to the number of dialcoholate or dihalide units reacted to give the desired molecular weight to the final polymers, as discussed hereinafter. Usually $z$ will be from 2 to 100, varying inversely with $n$, and preferably from 3 to 30.

In the preferred class of compounds illustrated by the above formulae, $R_1$ is an alkyl radical of from 4 to 12 carbon atoms, such as n-butyl, sec.-butyl, and n-amyl, n-hexyl, etc., $R_2$ is a propylene group, $R_3$ is a methylene group, and $n$ is an integer of 3 to 30. These particular compounds are prepared with the greatest facility by the process of this invention while avoiding the production of contaminating by-products. They are unusually superior oils of lubricating viscosity or of bright stock viscosity suitable for blending. They possess excellent viscosity temperature characteristics and unusual oil solubility characteristics which make them ideal for blending with mineral lubricating oil stocks.

The high molecular weight polyoxyalkylene glycols and ethers thereof having improved physical properties as lubricating oils according to my invention, may vary in average molecular weight from about 400 to about 8,000 generally. Dialkyl ethers of the high molecular weight polyoxyalkylene glycols having average molecular weights in the range from about 500 to about 1200 are particularly suitable as lubricating oils. The preferred dialkyl ethers of the high molecular weight polyoxypropylene glycols of the invention, as described above, possess an average molecular weight in the range of from about 3,000 to 8,000. As mentioned above, these viscous materials are excellent bright stocks. When the preferred alkyl groups of from 4 to 12 carbon atoms are employed, such as n-butyl, etc., they are characterized by excellent viscosity-temperature characteristics and may be blended with lighter, lower viscosity oils, such as low molecular weight polyglycols and neutral mineral lubricating oils to give oils of any desired physical characteristics.

The novel high molecular weight polyoxyalkylene glycols and ethers thereof, in accordance with the invention, are prepared by reacting 2 mols of a polyoxyalkylene glycol alkali metal monoalcoholate or monoether thereof with a dihalo methane or dihalo 2-alkene of the type described above. The polyoxyalkylene glycol starting material or its monoether is selected to have a molecular weight equal to one-half the molecular weight desired in the final product. The alkyl monoether of the polyoxyalkylene glycol may be readily obtained by reacting an alcohol having the desired hydrocarbon radical for the ether group with a definite number of alkylene oxide groups to produce the polyglycol monoether of proper molecular weight. The polyoxyalkylene glycol or its monoether is conveniently converted to the alkali metal alcoholate by reacting it with an alkali metal such as metallic sodium or potassium. The alkali metal alcoholate is then reacted with the methylene dihalide or 2-alkene dihalide, more suitably a member of the class consisting of methylene chloride, methylene bromide, methylene iodide, 1,4-dichloro-2-butene, 3,3-dichloropropene and bromochloromethane to form the novel compounds of this invention and alkali metal halide which are readily separated. The chlorides, and particularly methylene chloride, are presently preferred, since best results are obtained with them in the experimental work to date. To obtain the "bis" compounds described above, 2 mols of the polyglycol alkali metal monoalcoholate are reacted with 1 mol of the dihalo methane or dihalo 2-alkene in the process. The "copolymeric series" of compounds, as mentioned previously, are obtained by reacting 1 mol of dialcoholate with one mol of dihalide. In both cases, stoichiometric proportions are employed.

The reaction of the polyglycol alkali metal monoalcoholate or ether thereof with the dihalo methane or dihalo 2-alkene in accordance with the process of my invention is straightforward and is readily accomplished without the need for special apparatus or unusual reaction conditions. Temperatures in the range from about 50 to about 200° C. are desirable to accelerate the reaction. Preferred temperatures range from about 100 to 150° C., since at these temperatures the reaction is more complete and fewer by-products are apt to be formed. The reaction may be carried out at any desired pressure, whether atmospheric, subatmospheric, or superatmospheric. For most purposes superatmospheric pressures in the range from about 15 to about 50 p. s. i. g. are preferred. When the more volatile reactants, such as methylene chloride, are employed, it is desirable to use pressure equipment and conduct the reaction at pressures in the range of from about 30 to 50 p. s. i. g.

The products of the reaction, namely, the high molecular weight polyoxyalkylene glycols or ethers thereof and the alkali metal halide, may be conveniently separated by several methods. Since the akali metal halide precipitates readily at ordinary temperatures, any suitable method for separating liquids and solids may be employed to an advantage. Such methods include filtration, centrifuging, decanting, and the like.

Additional illustrations of the invention, including both the novel high molecular weight polyoxyalkylene glycols and ethers thereof and the novel process for preparing them, as described above, may be had by reference to the following examples. Unless otherwise specified, the proportions given are on a weight basis.

*Example I*

900 gms. of an iso-octyl monoether of polypropylene glycol having an average molecular weight of about 500 and about 500 gms. of xylene are placed in a reaction flask. To this mixture is added 36.0 gms. of metallic sodium. The mixture is heated with stirring until there is no longer any visible reaction.

The reaction product obtained above is placed in a bomb together with about 135 gms. of methylene bromide. The reaction is carried out at about 125° C. for 12 hours under autogenous pressure. Following this, the bomb is cooled, the contents removed and water-washed. The washed product is topped in a still, first at atmospheric pressure and then at 4 mm. mercury pressure to a pot temperature of about 200° C. 829 gms. of bottoms are thus obtained having the following analysis:

| | |
|---|---|
| Viscosity at 100° F _____Centistokes__ | 50.9 |
| Viscosity at 130° F _____do____ | 28.2 |
| Viscosity at 210° F _____do____ | 9.7 |
| Viscosity index _____ | 148 |
| Hydroxyl number _____ | 28 |

The above material is an excellent oil of lubricating viscosity.

*Example II*

1020 gms. of polypropylene glycol monobutyl ether having an average molecular weight of about 1700 and 11 gms. of sodium are placed in a reaction vessel with 500 ml. of xylene. The reaction mixture is warmed slowly to promote the reaction. When the reaction is complete, the products are charged to a pressure vessel together with 40.5 gms. of methylene chloride. The mixture is heated to 125° C. for about 8 hours. The pressure is autogenous.

Following the reaction, the bomb is cooled and the contents removed, filtered and washed with water. The products are then diluted with xylene and petroleum thinner. The product is stripped to remove water and solvent. The final product weighs 964 gms. and gives the following analysis:

| | |
|---|---|
| Viscosity at 100° F _____Centistokes__ | 710 |
| Viscosity at 130° F _____do____ | 354 |
| Viscosity at 210° F _____do____ | 101 |
| API gravity _____ | 9.7 |
| Hydroxyl number _____ | 20 |
| Percent chlorine, less than _____ | 0.02 |

*Example III*

585 gms. of polypropylene glycol having an average molecular weight of about 1020, is mixed with 585 gms. of xylene in a reaction flask. To this mixture is added 26.3 gms. of metallic sodium. The mixture is heated with stirring until there is no longer any visible reaction. The slight excess of sodium employed is removed by filtration.

The filtrate obtained above, consisting of the polypropylene glycol disodium alcoholate is reacted with 44.0 gms. of methylene chloride. The reaction mixture is heated in a pressure vessel under autogenous pressure at about 125° C. for 12 hours. The vessel is then allowed to cool and the reaction mixture removed. It is then water-washed and topped by distillation to remove low boiling unreacted materials, first at atmospheric pressure and then at 3 mm. Hg pressure to a pot temperature of 200° C. The product remaining, which comprises copolymeric (polyoxypropylene) (oxymethylene) glycols having an average molecular weight of 3,000 to 4,000, is then filtered. It has the following physical characteristics:

| | | |
|---|---|---|
| Viscosity at 100° F | Centistokes | 738 |
| Viscosity at 130° F | do | 355 |
| Viscosity at 210° F | do | 94.9 |
| Viscosity index | | 127 |
| Hydroxyl number | | 26 |
| Percent chlorine | | 0.37 |

The material was tested as an anti-foam agent in a conventional compounded Diesel engine lubricating oil and gave excellent results.

Although the compositions of the invention have been primarily described as lubricating oils, they are also useful for many other purposes known for polyglycols. They are excellent high boiling solvents. Their closely controllable volatility makes them particularly suitable as plasticizers. They are superior anti-foaming compounds for lubricating oil compositions, etc. Valuable surface-active agents may be prepared from them by modification of their terminal groups, as, for example, by sulfation, sulfonation, etc. They are also excellent hydraulic fluids for use in the field of heat and pressure transmission.

I claim:

The process which comprises reacting 2 mols of n-butyl ether of a polypropylene glycol sodium monoalcoholate, the n-butyl polypropylene glycol portion of which has an average molecular weight of from about 1,500 to about 4,000, with 1 mol of methylene chloride at a temperature of about 125° C. for about 8 hours, and separating the bis(n-butoxy polypropyleneoxy) methane having the formula:

$$[R_1O(R_2-O)_n]_2R_3$$

in which $R_1$ is butyl, $R_2$ is propylene, $R_3$ is methylene and $n$ is an integer of from 2 to 100 and the sodium chloride thus formed.

References Cited in the file of this patent

UNITED STATES PATENTS

| | | |
|---|---|---|
| 1,566,819 | Carter | Dec. 22, 1925 |
| 2,245,962 | Coleman et al. | June 17, 1941 |
| 2,609,344 | Johnson | Sept. 2, 1952 |